June 19, 1956    J. CHIN    2,750,713
CONTROLS FOR BEAN SPROUTING MACHINE
Filed Sept. 21, 1953
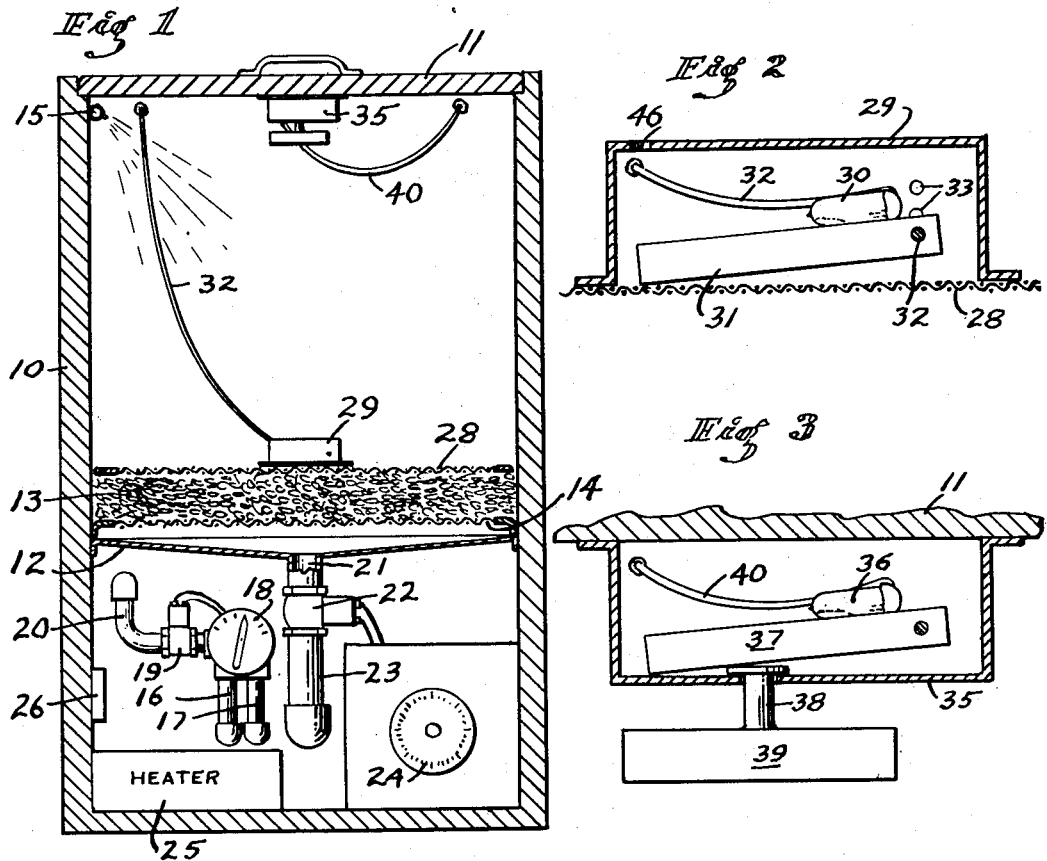
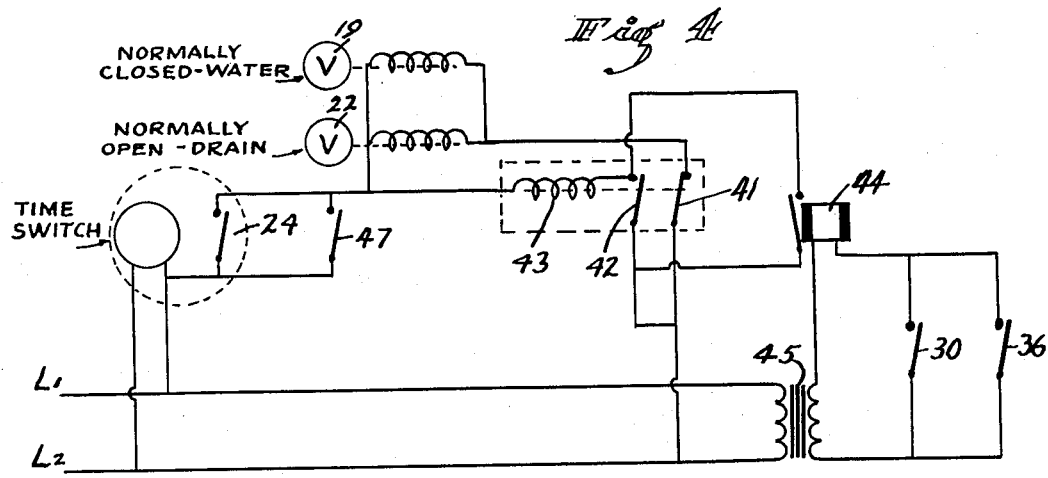
INVENTOR
JOHN CHIN
BY
Charles M Fryer
ATTORNEY

United States Patent Office 2,750,713
Patented June 19, 1956

2,750,713

CONTROLS FOR BEAN SPROUTING MACHINE

John Chin, San Francisco, Calif.

Application September 21, 1953, Serial No. 381,357

4 Claims. (Cl. 47—14)

This invention relates to the sprouting of beans or other seeds for the production of edible root sprouts and particularly to control means designed to insure ideal sprouting conditions.

It is common practice in producing bean sprouts for human consumption to place a quantity of beans in a container, maintain a desired temperature therein, and moisten the beans at periodic intervals to induce germination and growth of the sprouts to a desired size. Uniformity in growth is desired as is also rate of growth to produce a thick succulent sprout with a minimum of tentacle-like processes thereon.

There are two generally accepted methods of supplying water to the beans and growing sprouts; one being by spray and the other by immersion. The spray method is undesirable because the mass of beans is not uniformly treated. The growing process produces heat in excess of the ideal atmospheric temperature. Since the purpose of water is to reduce or modify this heat in addition to supplying moisture, the non-uniform application of water by spray often results in an inferior product. Immersion also has disadvantages in that it is difficult to control with a mass of beans that is constantly enlarging due to growth. The application of too much water tends to cool the growing mass too greatly and too quickly, and, therefore, to retard growth and produce an undesirable product.

The present invention has for its object the provision of controls for a bean sprouting machine that will insure the application of the ideal quantity of water to the growing product at proper intervals notwithstanding the natural expansion of the product. Another object of the invention is to provide means in such a machine to insure against the application of any water after the sprouts have attained a certain growth. Still further and more specific objects and advantages of the invention are made apparent in the following specification wherein a typical form of the invention is described by reference to the accompanying drawings.

In the drawings:

Fig. 1 is a vertical transverse section through a bean sprouting machine with controls embodying the present invention, Fig. 2 is an enlarged sectional view through one of the control elements illustrated in Fig. 1, Fig. 3 is a similar view through another of the control elements illustrated in Fig. 1, and Fig. 4 is a diagram of the electrical circuits in which the controls are included.

In Fig. 1 of the drawings, a typical bean sprouting machine is illustrated as comprising a rectangular case 10 with a cover 11 thereon. A horizontal partition 12 divides the case into upper and lower compartments, the upper compartment being employed for the sprouting of beans and the lower compartment forming a chamber for reception of some of the operating and control mechanism. The batch of beans illustrated at 13 in Fig. 1 rests on a perforate plate or screen 14 preparatory to being treated and water to moisten the beans is sprayed from a perforate tube 15 adjacent the upper portion of the upper compartment. The water is supplied to the tube 15 through hot and cold water inlets 16 and 17 connected with suitable sources of supply, not shown, and terminating in a mixing valve 18, the purpose of which is to regulate the temperature of the water. The water of proper temperature is delivered from the mixing valve through a magnetically controlled water valve 19 and a pipe 20 which communicates with the sprinkler pipe 15 through a connection behind the container, not shown.

The partition 12 which forms the bottom of the uppermost chamber in which the beans are treated is inclined centrally toward a drain outlet 21, the flow through which is controlled by an electro-magnetically actuated valve 22. When the valve is open, the water passes through a pipe 23 to a sewer connection or the like, not shown. A time switch, the dial of which is indicated at 24 in Fig. 1 is included in the circuit which controls the water valve 19 and serves the purpose of opening the water valve for a limited period of time at periodic intervals to effect moistening of the sprouting beans. A heater indicated at 25 in Fig. 1 maintains a desired temperature within the cabinet and it is preferably under control of a thermostat as indicated at 26.

In operation, a desired quantity of beans, usually a few inches, is spread upon the screen 14 in the bottom of the treating chamber. These beans are moistened at regular intervals, say about once every four hours and as the beans sprout and the sprouts grow, their volume increases to the extent that they approximately double the space which they occupy each day. At about the end of the fourth day, the beans and sprouts substantially fill the upper portion of the cabinet and they are ready for removal and consumption.

It has been found that approximately the right quantity of water for moistening the beans during their sprouting period is just enough to fully immerse or cover the beans in the cabinet and if this water is drained promptly, its cooling effect upon the beans will not be sufficiently great to inhibit the proper and regular growth of the sprouts.

To accomplish this effect, I have provided a perforate plate or screen 28 of light weight which rests entirely upon the top of the beans in the cabinet and which is raised as the growth of the sprouts on the beans causes their volume to increase. Resting on top of and preferably secured to the screen 28 is a switch housing 29, see also Fig. 2, which contains a float actuated switch. Consequently each time the beans are moistened by a spray emanating from the pipe 15 the switch in the housing 29 is actuated and this switch is connected with the water valve in a manner to discontinue the supply of water and is also effective to open the drain valve 22 so that the water is drained away from the beans leaving them moist without immersing them a sufficient time to cause excessive cooling.

The switch within the housing 29 consists of a conventional glass mercury capsule 30 secured to a float 31 which is pivotally mounted on a shaft 32 extending through suitable perforations in the walls of the housing to permit rocking movement of the float. The float may be made of cork or any suitable buoyant material. There are preferably extra sets of perforations as indicated at 33 in the walls of the housing so that the position of the float may be adjusted to require slightly more or less water for closing of the switch as desired. The glass capsule 30 is of the type which contains a globule of mercury and has a pair of conducting wires extending into one of its ends. When the capsule occupies one position, the mercury is in the opposite end thereof but when it is rocked as by raising the float 31, the mercury forms a contact between the ends of the wires which in effect completes a circuit. A two wire cable 32 is connected with the mercury capsule and is led, as illustrated in Fig. 1, to the upper portion of the container where it connects with the other conductors of the electrical circuit which will presently be described in detail.

The second switch housing shown at 35 in Figs. 1 and 3 also contains a mercury switch 36 carried by a rocking member 37 similar in construction and mounting to the float 31 in Fig. 2. In the normal position of the member 37, the mercury switch 36 is open but is actuated toward a closed position by a plunger 38 reciprocably mounted in the lower side of the housing and having a large contact member 39 on its lower end. The purpose of this second mercury switch is to prevent the spraying of water upon the beans after they have sprouted and grown to their desired size so that they cannot raise the cover 11 and spill out of the container. When the sprouting beans have expanded to the desired extent, they substantially fill the upper portion of the container and the screen 28 contacts the member 39, raising the plunger 38 against the rocking support 37 and thus closing the mercury switch 36 which, as presently will be described, prohibits further delivery of water to the beans. A conductor cable 40 leads from the switcht 36 in the same manner as the cable 32.

Now referring to Fig. 4 of the drawings, the electrical circuits which accomplish the foregoing operation are disclosed. In this figure the main source of electrical supply is shown as lines L1 and L2 which are connected through the time switch 24 to solenoids which actuate the normally closed water valve 19 and the normally opened drain valve 22. The time switch is set to close at periodic intervals, say once every four hours, and to remain closed a period sufficiently long to insure more than an ample supply of water to the beans that are sprouting. The circuit originating in L1 therefore passes through time switch 24 and through the solenoids of valves 19 and 22, which are connected in parallel, and returns through a closed switch 41 thus completing the circuit. The switch 41, which is normally closed, is actuated simultaneously with a normally open switch 42 both being controlled by a solenoid 43 so that upon energization of this solenoid the switch 41 is opened and switch 42 is closed. The solenoid 43 is energized by a relay 44 in a low potential circuit which includes both the mercury switch 30 and the mercury switch 36. This circuit receives its energy through a transformer indicated at 45, the input energy of which is received from L1 and L2.

Assuming now that the time switch has closed to open the water valve and close the drain valve, water from the spray pipe 15 will collect in the chamber until the sprouting beans therein are completely immersed and as the level of the water enters the housing 29, the float 31 is raised about its pivot and the mercury switch 30 is closed. A vent 46 is provided in the switch housing to permit the escape of air as the water rises therein. When switch 30 is closed, relay 44 closes its switch to energize solenoid 43 and reverse the positions of switches 42 and 41. Opening of switch 41 breaks the circuit through valves 19 and 22 so that the water valve 19 again closes and the drain valve 22 opens permitting immediate escape of all of the water in which the beans are immersed. Meanwhile the circuit through the time switch 24 is completed through the switch 42 which is now closed and, since the solenoid 43 continues to be energized until the time switch 24 opens, the cycle of the timing device is not interrrupted. As soon as the time switch opens, all of the parts are again in their normal position illustrated so that the mercury switch 30 will again control the amount of water the next time that the sprouting beans are moistened. However since the mercury switch 30 is supported by the screen 28 which moves upwardly as the beans expand, the amount of water delivered each time will be different and will be just sufficient to completely immerse the beans before the water supply is closed and the drain valve opened.

The manner in which the mercury switch 36 prevents over-growing of the sprouting beans is apparent from Fig. 4 wherein it may be seen that closing of the switch 36 when the beans approach the top of the cabinet will also energize the relay 44 to open switch 41 if the time switch 24 closes and break the circuit to the drain valve and water valve thus preventing any further water from being supplied to the beans.

An auxiliary switch is shown at 47 as parallel to the time switch 24. This auxiliary switch may be manually actuated and is provided for the purpose of supplying extra water to the interior of the cabinet either for rinsing the beans therein or for cleaning the cabinet itself. Closing of the switch 47 of course opens the water valve and closes the drain valve and water in any desired quantity may be supplied to the interior of the cabinet through the operation of this switch.

The control of the moisture and temperature during the period when beans are sprouting is extremely important and the present invention serves automatically to insure against excesses of either. For example in a normal operation, the temperature within the cabinet is maintained at about 72° F. while the water supplied to the beans is somewhere between 65° F. and 70° F. When the growth of the bean sprouts starts the temperature created in the mass of beans by the growth phenomenon may reach 90° F. or more. When water is supplied to beans must be thoroughly wetted to stimulate growth and to provide partial cooling. The complete immersion and immediate draining of the beans provided by the present invention insures complete wetting and prevents excessive cooling which is likely to occur with other immersion methods. The resulting product is therefore of uniformly good quality.

I claim:

1. In a bean sprouting machine which includes a chamber to receive beans, a valve controlled water supply to the chamber, and a valve controlled drain for removing water from the chamber, electrically actuated means to open the water valve and close the drain valve, and a switch in said means operable upon water in the chamber reaching a level slightly above the beans therein and effective to close the water valve and open the drain valve, said switch being supported by the top of a mass of beans in the chamber whereby its position will change as the mass increases due to sprouting of the beans.

2. In a machine for sprouting beans or the like including a chamber to receive beans and electrically actuated valve means to control the admission of water to the chamber, a perforate plate supported entirely by the beans in the chamber and float actuated switch means carried by said plate and included in the circuit of said electric valve control whereby the water valve will be closed when water in the chamber immerses the beans.

3. In a machine for sprouting beans or the like, a chamber with a removable cover for the reception of beans, means to deliver water to the chamber including an electrically actuated valve, and a switch controlling the operation of said valve and supported by said cover with a depending switch operating member whereby upon growth of a mass of sprouting beans to a level adjacent the cover the switch will be actuated to prevent opening of the water valve.

4. In a machine for sprouting beans or the like including a chamber for the reception of beans, valve controlled means to direct water into the chamber, valve controlled drain means, electric control means for the water valve and drain valve, a time switch in the control circuit operable periodically to open the water valve and close the drain valve, a second switch in the circuit operable when water in the chamber immerses the beans to reverse the positions of the valves, and a third switch operable upon predetermined expansion of the beans due to sprout growth to prevent opening of the water valve by the time switch.

References Cited in the file of this patent

UNITED STATES PATENTS

| | | |
|---|---|---|
| Re. 23,076 | Pick | Jan. 11, 1949 |
| 2,051,094 | Loughridge | Aug. 18, 1936 |
| 2,060,735 | Krueger | Nov. 10, 1936 |
| 2,131,335 | Sullivan | Sept. 27, 1938 |
| 2,131,743 | Loughridge | Oct. 4, 1938 |
| 2,171,579 | Loughridge | Sept. 5, 1939 |
| 2,296,849 | Hammerstrom | Sept. 29, 1942 |

FOREIGN PATENTS

| | | |
|---|---|---|
| 473,279 | Great Britain | Oct. 4, 1937 |